United States Patent
Zhamu et al.

(10) Patent No.: US 10,081,551 B2
(45) Date of Patent: *Sep. 25, 2018

(54) SUPERCRITICAL FLUID PROCESS FOR PRODUCING GRAPHENE FROM COKE OR COAL

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/211,408

(22) Filed: Jul. 15, 2016

(65) Prior Publication Data

US 2018/0016149 A1    Jan. 18, 2018

(51) Int. Cl.
| | |
|---|---|
| *C01B 32/19* | (2017.01) |
| *B82Y 40/00* | (2011.01) |
| *H01B 1/04* | (2006.01) |
| *C09D 11/00* | (2014.01) |
| *C09D 5/24* | (2006.01) |
| *C08J 5/00* | (2006.01) |
| *C08K 3/04* | (2006.01) |
| *B05D 3/00* | (2006.01) |

(52) U.S. Cl.
CPC ............... *C01B 32/19* (2017.08); *B05D 3/007* (2013.01); *C08J 5/00* (2013.01); *C08K 3/04* (2013.01); *C09D 5/24* (2013.01); *C09D 11/00* (2013.01); *H01B 1/04* (2013.01); *C08J 2300/24* (2013.01)

(58) Field of Classification Search
CPC .......... B82Y 30/00; B82Y 40/00; H01B 1/04; C01B 32/19; C01B 32/182; C01B 32/22

USPC ............... 252/510, 500, 511; 977/734, 890; 423/448, 460

See application file for complete search history.

(56) References Cited

U.S. PATENT DOCUMENTS

| | | |
|---|---|---|
| 6,872,330 B2 | 3/2005 | Mack |
| 7,071,258 B1 | 7/2006 | Jang |
| 7,327,000 B2 | 2/2008 | DeHeer |

(Continued)

FOREIGN PATENT DOCUMENTS

| | | |
|---|---|---|
| JP | 2015160945 A | 9/2015 |
| WO | 2014087992 A1 | 6/2014 |

OTHER PUBLICATIONS

PCT/US17/36030, International Search Report and Written Opinion dated Sep. 6, 2017, 11 pages.

(Continued)

*Primary Examiner* — Tri V Nguyen

(57) ABSTRACT

Provided is a process for producing isolated graphene sheets from a supply of coke or coal powder containing therein domains of hexagonal carbon atoms and/or hexagonal carbon atomic interlayers. The process comprises: (a) subjecting the supply of coke or coal powder to a supercritical fluid at a first temperature and a first pressure for a first period of time in a pressure vessel and then (b) rapidly depressurizing the supercritical fluid at a fluid release rate sufficient for effecting exfoliation and separation of the coke or coal powder to produce isolated graphene sheets, wherein the coke or coal powder is selected from petroleum coke, coal-derived coke, meso-phase coke, synthetic coke, leonardite, anthracite, lignite coal, bituminous coal, or natural coal mineral powder, or a combination thereof.

21 Claims, 2 Drawing Sheets

(56) References Cited

U.S. PATENT DOCUMENTS

| | | |
|---|---|---|
| 7,623,340 B1 | 11/2009 | Song |
| 7,948,739 B2 | 5/2011 | Zhamu |
| 2005/0271574 A1 | 12/2005 | Jang |
| 2008/0048152 A1 | 2/2008 | Jang |
| 2009/0061312 A1 | 3/2009 | Zhamu |
| 2010/0021819 A1 | 1/2010 | Zhamu |
| 2010/0044646 A1 | 2/2010 | Zhamu et al. |

OTHER PUBLICATIONS

Sasikala et al., "High yield synthesis of aspect ratio controlled graphenic materials from anthracite coal in supercritical fluids" ACS Nano (2016) vol. 10, pp. 5293-5303.
Stankovich et al., "Stable aqueous dispersions of graphitic nanoplatelets via the reduction of exfoliated graphite oxide in the presence of poly(sodium 4-styrenesulfonate)" Journal of Materials Chemistry (2005) vol. 16, pp. 155-158.
Bor Z. Jang and A. Zhamu, "Processing of Nano Graphene Platelets (NGPs) and NGP Nanocomposites: A Review," J. Materials Sci. 43 (2008) 5092-5101.
William S. Hummers, Jr., et al., Preparation of Graphitic Oxide, Journal of the American Chemical Society, 1958, p. 1339.
Yang, et al. "Two-dimensional Graphene Nano-ribbons," J. Am. Chem. Soc. 130 (2008) 4216-17.
Reid, R.C.; Prausnitz, J.M. and Poling, B.E, The Properties of Gases and Liquids, McGraw-Hill, New York, pp. A.5-A.19, 5th ed, 2000.

SUPERCRITICAL FLUID PROCESS FOR PRODUCING GRAPHENE FROM COKE OR COAL

FIELD OF THE INVENTION

The present invention relates to a process for producing isolated thin graphene sheets (single-layer or few-layer) directly from natural coal or coal derivatives (e.g. needle coke) using supercritical fluid intercalation, exfoliation, and separation.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274, 473, submitted on Oct. 21, 2002; now U.S. Pat. No. 7,071, 258 (Jul. 4, 2006)]. The processes for producing NGPs and NGP nanocomposites were reviewed by us [Bor Z. Jang and A. Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2}d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded (oxidized or intercalated) or exfoliated GO powder is dispersed in water or aqueous alcohol solution, which is subjected to ultrasonication. It is important to note that in these processes, ultrasonication is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) Both heat- and solution-induced exfoliation approaches require a very tedious washing and purification step. For instance, typically 2.5 kg of water is used to wash and recover 1 gram of GIC, producing huge quantities of waste water that need to be properly treated.

(5) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(6) Furthermore, the quantity of intercalation solution retained on the flakes after draining may range from 20 to 150 parts of solution by weight per 100 parts by weight of graphite flakes (pph) and more typically about 50 to 120 pph.

(7) During the high-temperature exfoliation, the residual intercalate species (e.g. sulfuric acid and nitric acid) retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene Sheets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating natural graphite with potassium metal melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a graphene production process that requires a reduced amount of undesirable chemicals (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and less damaged), more electrically conductive, and larger/wider graphene sheets.

Furthermore, most of the prior art processes for graphene production begin with the use of highly purified natural graphite as the starting material. The purification of graphite ore involves the use of large amounts of undesirable chemicals. Clearly, a need exists to have a more cost-effective process that produces graphene sheets (particularly single-layer graphene and few-layer graphene sheets) directly from coal or coal derivatives. Such a process not only avoids the environment-polluting graphite ore purification procedures but also makes it possible to have low-cost graphene available. As of today, the graphene, as an industry, has yet to emerge mainly due to the extremely high graphene costs that have thus far prohibited graphene-based products from being widely accepted in the marketplace.

SUMMARY OF THE INVENTION

The present invention provides a process for producing isolated graphene sheets having an average thickness smaller than 10 nm (preferably and typically single-layer graphene or few-layer graphene) directly from a coke or coal powder having hexagonal carbon atomic interlayers or domains (graphene planes or graphene domains) with an interlayer spacing (inter-graphene plane spacing).

The process for producing isolated graphene sheets from a supply of coke or coal powder comprises: (a) bringing this supply of coke or coal powder in contact with a supercritical fluid at a first temperature and a first pressure for a first period of time in a pressure vessel (preferably completely immersing the coal/coke powder in this fluid) to enable penetration of the supercritical fluid into the internal structure of the coke/coal particles, and then (b) rapidly depressurizing the supercritical fluid at a fluid release rate sufficient for effecting exfoliation and separation of the coke or coal powder to produce the isolated graphene sheets; wherein the coke or coal powder is selected from petroleum coke, coal-derived coke, meso-phase coke, synthetic coke, leonardite, anthracite, lignite coal, bituminous coal, or natural coal mineral powder, or a combination thereof. In certain embodiments, these particles of coke or coal powder have never been previously intercalated or oxidized prior to step (a).

The supercritical fluid as used herein can comprise a fluid selected from carbon dioxide, water, hydrogen peroxide ($H_2O_2$), methanol, ethanol, acetone, methane, ethane, propane, ethylene, propylene, nitrous oxide ($N_2O$), ozone, sulfonic group ($SO_3$), or a combination thereof.

In some preferred embodiments, step (a) of the process is conducted under the influence of ultrasonic waves. In other words, the coke/coal powder is subjected to concurrent treatments by ultrasonication and supercritical fluid penetration/intercalation in the same pressure chamber.

The depressurizing step may be followed by a mechanical shearing treatment selected from air milling, air jet milling, wet milling, ball milling, rotating blade shearing, ultrasonication, or a combination thereof. This mechanical shearing treatment may be used to further reduce the thickness (number of graphene planes) of isolated graphene sheets. This may be conducted when the resulting graphene sheets after the supercritical fluid treatment are multi-layer graphene platelets (from 2 to 20 layers).

Alternatively, multi-layer graphene platelets may be reduced to few-layer (2-10 planes) or single-layer graphene by repeating the supercritical fluid exposure and de-pressurization treatments. Thus, in some embodiments, the process further comprises a procedure of essentially repeating step (a) and step (b) that includes (i) subjecting the isolated graphene sheets to a supercritical fluid at a second temperature and a second pressure for a second period of time in a pressure vessel and then (ii) rapidly depressurizing the fluid at a fluid release rate sufficient for effecting further exfoliation and separation of graphene sheets. The second temperature may be the same or different from the first temperature and the second pressure may be the same or different from the first pressure.

Preferably, the supercritical fluid contains a surfactant or dispersing agent dissolved therein. Thus, the pressure vessel may further contain a surfactant or dispersing agent selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, and combinations thereof.

In some embodiments, the pressure vessel further contains a surfactant or dispersing agent selected from melamine, ammonium sulfate, sodium dodecyl sulfate, sodium (ethylenediamine), tetraalkylammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof.

In certain embodiments, the supercritical fluid contains therein an organic solvent, a monomer, an oligomer, a polymer solution, or a combination thereof. In some embodiments, the supercritical fluid further comprises a monomer or an oligomer dispersed in the fluid and step (b) of the process is followed by polymerization of the monomer or oligomer to form a polymer.

In certain embodiments, the supercritical fluid contains a coating agent dissolved therein. The coating agent may comprise a monomer, a prepolymer or oligomer, a polymer, a resin, a curing agent, or a combination thereof.

In some embodiments, the supercritical fluid contains a curing agent dissolved therein and the process further comprises mixing the isolated graphene sheets with a thermosetting resin.

In the invented process, the supercritical fluid may comprise a reactive chemical group and step (a) imparts the reactive chemical group to the isolated graphene sheets.

The invented process may be conducted intermittently or continuously and the supply of coke or coal powder and supercritical liquid are provided into the pressure vessel intermittently or continuously.

In some embodiments, the supercritical fluid contains a curing agent dissolved therein and the process further comprises mixing the isolated graphene sheets with a thermosetting resin to form a mixture. Preferably, the process further comprises a step of curing the graphene-resin mixture into a composite material.

The present invention also provides a graphene-containing ink composition containing graphene sheets derived from coal or coke produced by the presently invented process. Also provided is a composite material containing graphene sheets produced by the invented process. The invention also provides a mass of isolated graphene sheets in a powder form produced in the invented process. Also provided is a suspension containing a liquid medium and isolated graphene sheets produced by the invented process and these graphene sheets are dispersed in this liquid medium.

DETAILED DESCRIPTION OF PREFERRED EMBODIMENTS

Figure 1:
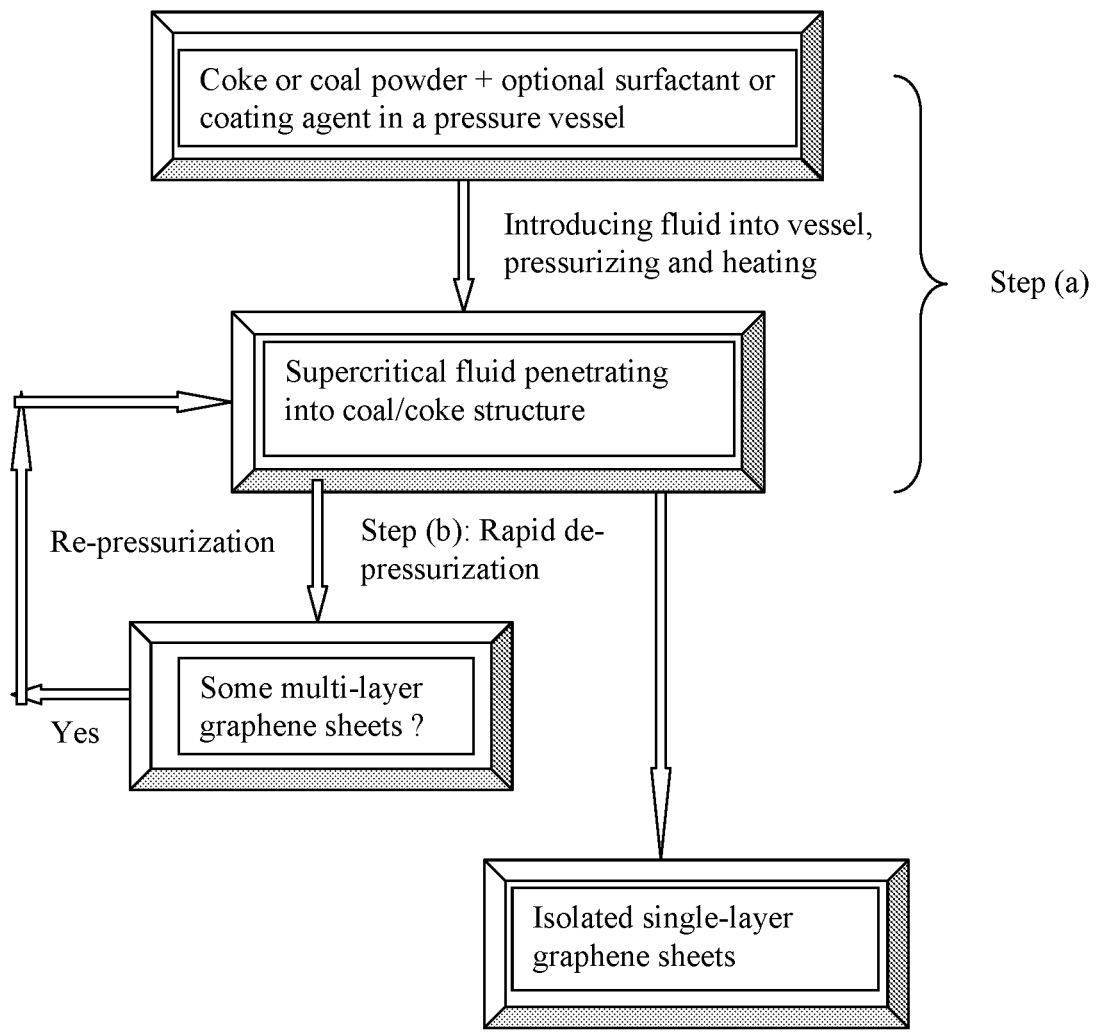
FIG. 1 A flow chart showing an embodiment of the presently invented process for producing isolated graphene sheets.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Basically, a graphite material is composed of many graphene planes (hexagonal carbon atomic interlayers) stacked together having inter-planar spacing. These graphene planes can be exfoliated and separated to obtain isolated graphene sheets that can each contain one graphene plane or several graphene planes of hexagonal carbon atoms. Further, natural graphite refers to a graphite material that is produced through purification of graphite mineral (mined graphite ore or graphite rock) typically by a series of flotation and acid treatments. Particles of natural graphite are then subjected to intercalation/oxidation, expansion/exfoliation, and separation/isolation treatments as discussed in the Background section.

The instant invention obviates the need to go through the graphite purification procedures that otherwise generate great amounts of polluting chemicals. In fact, the instant invention avoids the use of natural graphite all together as a starting material for the production of graphene sheets. Instead, we begin with coal or its derivatives (including coke, particularly needle coke). No undesirable chemicals, such as concentrated sulfuric acid, nitric acid, and potassium permanganate, are used in the presently invented method.

One preferred specific embodiment of the present invention is a process for producing isolated graphene sheets, also called nano graphene platelets (NGPs), directly from coal powder without purification. We have surprisingly discovered that powder of coal (e.g. leonardite or lignite coal) contains therein graphene-like domains or stacks of aromatic molecules that span from 5 nm to 1 μm in length or width. These graphene-like domains contain planes of hexagonal carbon atoms and/or hexagonal carbon atomic interlayers with an interlayer spacing. These stacks or domains of graphene-like planes, molecules or interlayers are typically interconnected with disordered chemical groups containing typically C, O, N, P, and/or H. The presently invented supercritical fluid process is capable of intercalating, exfoliating, and/or separating the interlayers and/or separating domains of graphene-like planes from the surrounding disordered chemical species to obtain isolated graphene sheets.

Each graphene sheet comprises one or multiple planes of two-dimensional hexagonal structure of carbon atoms. Each graphene sheet has a length and a width parallel to the graphene plane and a thickness orthogonal to the graphene plane. By definition, the thickness of an NGP is 100 nanometers (nm) or smaller (more typically <10 nm and most typically and desirably <3.4 nm (i.e. few-layer graphene sheets each containing 2-10 graphene planes), with a single-sheet NGP (single-layer graphene) being as thin as 0.34 nm. The length and width of a NGP are typically between 5 nm and 10 µm, but could be longer or shorter. Generally, the graphene sheets produced from the coal or coke powder using the presently invented method are single-layer graphene or few-layer graphene (2-10 graphene planes stacked together).

A preferred embodiment of the present invention is a process that involves intercalating, exfoliating, and/or separating a coal or coke material with a supercritical fluid to obtain isolated graphene sheets. Optionally, a supercritical fluid can comprise therein a surfactant (or dispersing agent), a coating agent (e.g., a monomer, curing agent, or resin), and/or a reactive species (e.g., ozone, oxygen, acid vapor, $SO_3$, etc.).

If a substance is heated above a critical temperature (Tc) and pressurized above a critical pressure (Pc), it becomes a supercritical fluid. Supercritical fluids provide convenient means to achieve solvating properties, which have both gas and liquid characteristics without actually changing the chemical structure of a substance. With a careful control over the pressure and temperature, several physicochemical properties (e.g., density, diffusivity, dielectric constant, viscosity, and surface free energy) of this substance can be varied to a significant extent. In particular, under supercritical fluid conditions, a fluid can readily diffuse into the internal structure of a solid material. We have surprisingly observed that supercritical fluids can penetrate spaces between graphene-like or graphene oxide-like planes in a coal or coke structure and, through variations in temperature and pressure can exfoliate and separate these planes to obtain isolated graphene sheets. The supercritical fluids are also surprisingly capable of severing and extracting graphene domains or individual graphene sheets from a complex graphene domain-amorphous structure commonly found in a coal or coke material.

As an example, carbon dioxide may exist as a supercritical fluid having properties of both a liquid and a gas when above its critical temperature (>31° C.) and critical pressure (>7.4 MPa). Under supercritical conditions, $CO_2$ exhibits both a gaseous property, being able to penetrate through many materials, and a liquid property, being able to dissolve many materials. Although $CO_2$ is a preferred medium, the supercritical fluid may be selected from other suitable species, such as water, hydrogen peroxide, ozone, nitrous oxide, methane, ethane, ethylene, propylene, ethanol, methanol, or a mixture thereof (Table 1). The supercritical point of water comprises a temperature of at least about 374° C. and a pressure of at least about 22.1 MPa. At or about the supercritical point, the density and viscosity of water decreases and the diffusivity of water molecules and the mobility of other chemical species dissolved in the water increase.

TABLE 1

Critical properties of various solvents
(Reid, R. C.; Prausnitz, J. M. and Poling, B. E.,
The Properties of Gases and Liquids, McGraw-Hill, New York, 987).

| Solvent | Molecular weight g/mol | Critical temperature (Tc) ° K | Critical pressure (Pc) MPa (atm) | Critical density g/cm³ |
|---|---|---|---|---|
| Carbon dioxide ($CO_2$) | 44.01 | 304.1 | 7.38 (72.8) | 0.469 |
| Water ($H_2O$) | 18.015 | 647.096 | 22.064 (217.755) | 0.322 |
| Methane ($CH_4$) | 16.04 | 190.4 | 4.60 (45.4) | 0.162 |
| Ethane ($C_2H_6$) | 30.07 | 305.3 | 4.87 (48.1) | 0.203 |
| Propane ($C_3H_8$) | 44.09 | 369.8 | 4.25 (41.9) | 0.217 |
| Ethylene ($C_2H_4$) | 28.05 | 282.4 | 5.04 (49.7) | 0.215 |
| Propylene ($C_3H_6$) | 42.08 | 364.9 | 4.60 (45.4) | 0.232 |
| Methanol ($CH_3OH$) | 32.04 | 512.6 | 8.09 (79.8) | 0.272 |
| Ethanol ($C_2H_5OH$) | 46.07 | 513.9 | 6.14 (60.6) | 0.276 |
| Acetone ($C_3H_6O$) | 58.08 | 508.1 | 4.70 (46.4) | 0.278 |
| Nitrous oxide ($N_2O$) | 44.013 | 306.57 | 7.35 (72.5) | 0.452 |

Hence, as a preferred embodiment, the presently invented process comprises: (a) exposing a coal or coke material to a supercritical fluid at a first temperature and a first pressure for a first period of time in a pressure vessel and then (b) rapidly depressurizing the fluid by discharging part of the fluid out of the vessel at a fluid release rate sufficient for effecting exfoliation and separation of the graphene-like domains to obtain the desired graphene sheets. Presumably, the supercritical fluid in the pressure vessel penetrates into the spaces between graphene-like planes or between graphene-like domains to form a tentatively intercalated coal/coke compound. With rapid depressurization, the fluid in the interstitial spaces or between domains quickly expands to push apart neighboring graphene layers or severing the amorphous carbon regions that connect graphene-like domains together, a process called delamination/exfoliation or separation/isolation. This step produces graphene sheets that are typically thinner than 10 nm in thickness, more typically thinner than 3.4 nm (few-layer graphene), and often single-layer graphene. The starting material may be selected from petroleum coke, coal-derived coke, mesophase coke, synthetic coke, leonardite, anthracite, lignite coal, bituminous coal, or natural coal mineral powder, or a combination thereof.

As a first step, the starting material (e.g., powder of needle coke or lignite coal) is placed inside a high pressure vessel. The vessel is then sealed off from the atmosphere. This is followed by introducing high-pressure $CO_2$ into the vessel with $CO_2$ being pressurized to preferably above approximately 1,070 to 10,000 psig (7.4 MPa to 69 MPa). Then, the vessel is heated to a temperature above 31.5° C., preferably above about 40° C., and more preferably above 70° C. These conditions define a supercritical condition of $CO_2$ whereby the $CO_2$ is capable of penetrating into inter-graphene spaces or between graphene domains. Pressurizing and heating the coal or coke particles with the supercritical fluid may be accomplished by any conventional means. For instance, the vessel may be heated by a heating jacket or electrical heating tape wrapped around the vessel.

If a chemical species, such as reactive ozone molecules, is desired, it can be introduced into the pressure vessel before, during, or after the intended supercritical fluid is introduced. If the species is in a liquid state (e.g., a surfactant or a curing agent for a resin) or solid state (e.g., a resin), it is preferably placed into the vessel (e.g., mixed with the starting coal/coke material) prior to sealing off the vessel.

The procedure further comprises rapidly depressurizing the tentatively intercalated coal/coke by releasing the fluid out of the vessel at a high rate. During catastrophic depressurization, the supercritical fluid rapidly expands to exfoliate/separate the graphene planes or domains. The depressurization step comprises immediately depressurizing the vessel down to a considerably lower pressure, preferably ambient pressure. This may be accomplished in a time period of between about 5 and 30 seconds, and preferably 15 seconds. Specifically, this may be accomplished by depressurizing the pressure vessel at a rate of between about 0.1 and 5.0 milliliters per second, and preferably 3.0 milliliters per second. The pressure decrease may be accomplished by opening a vessel valve to the atmosphere. As immediate depressurization occurs, the graphite layers are delaminated apart from one another.

The process may further comprise a procedure that involves essentially repeating the pressurization/heating step and the depressurization step for at least another cycle. The repeating cycle includes (a) exposing the graphene sheets (containing multi-layer sheets) to a supercritical fluid at a second temperature and a second pressure for a second period of time in a pressure vessel (preferably the same vessel) and then (b) rapidly de-pressurizing the fluid at a fluid release rate sufficient for effecting further exfoliation/separation of the graphene planes. The second temperature may be different from or the same as the first temperature and the second pressure may be different from or the same as the first pressure. It was observed that a higher pressure for a given pressurization time tended to result in a more effective exfoliation/separation, as evidenced by a reduced average graphene thickness.

In another preferred embodiment, the supercritical fluid contains a surfactant or dispersing agent dissolved therein. Surfactants or dispersing agents that can be used include anionic surfactants, non-ionic surfactants, cationic surfactants, amphoteric surfactants, silicone surfactants, fluoro-surfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium ligno-sulphonate (e.g., marketed under the trade names Vanisperse CB and Marasperse CBOS-4 from Borregaard LignoTech), sodium sulfate, sodium phosphate, and sodium sulfonate. Presumably, a surfactant is capable of rapidly covering the new surfaces created during the delamination or separation between two graphene layers, thereby preventing the re-formation of inter-graphene van der Waals forces (re-stacking of two graphene sheets). This speculation was consistent with our surprising observation that the presence of a surfactant tends to result in much thinner graphene sheets as compared with the surfactant-free case under comparable processing conditions. It is of significance to note that the surfactant is normally easy to remove after the formation of isolated graphene sheets; e.g., via heat-induced vaporization or simple water rinsing.

Again, the procedure of supercritical fluid intercalation (pressurizing and heating) and exfoliation/separation (depressurization) can be repeated for at least another cycle to further reduce the thickness of NGPs. The cycle can include (a) subjecting the graphene sheets to a supercritical fluid (containing a surfactant dissolved therein) at a second temperature and a second pressure for a second period of time in a pressure vessel and then (b) rapidly depressurizing the fluid at a fluid release rate sufficient for effecting further exfoliation of the NGP material. Again, the second temperature may be different from or the same as the first temperature and the second pressure may be different from or the same as the first pressure.

In yet another preferred embodiment of the present invention, the supercritical fluid contains a coating agent dissolved therein. The process comprises supercritical fluid intercalation (at a first temperature and first pressure) and exfoliation/separation of a coal/coke material to produce graphene sheets and then repeating the supercritical fluid intercalation and exfoliation/separation steps for the resulting graphene sheets. These repeating steps include (a) subjecting the graphene sheets to a supercritical fluid (containing a coating agent dissolved therein) at a second temperature and a second pressure for a second period of time in a pressure vessel and then (b) rapidly de-pressurizing the fluid at a fluid release rate sufficient for effecting further exfoliation/separation of the graphene sheets.

The coating agent may comprise a monomer, a prepolymer or oligomer, a polymer, a resin, a curing agent, or a combination thereof. This process is particularly useful for the production of thin NGP-reinforced polymer composites. For the preparation of a thermoset resin composite, it is advantageous to have a supercritical fluid containing a curing agent dissolved therein. The curing agent, typically a low molecular weight species, can penetrate into the inter-graphene spaces (also referred to as interstitial spaces), along with the supercritical fluid. Upon-depressurization, the curing agent will precipitate out to cover the newly formed graphene surfaces. In addition to possibly serving to prevent the re-joining of graphene layers, the curing agent also acts to change the graphene surface properties, promoting the subsequent wetting of the graphene surface by a thermosetting resin (e.g., epoxide). Hence, the process further comprises mixing the curing agent-covered graphene material with a thermosetting resin.

One may choose to use a coating agent that can be solubilized in the supercritical fluid to diffuse between the graphene planes or between two neighboring graphene-like domains. This coating agent could expand or swell the interstitial spaces between graphene planes to assist in intercalation and exfoliation and, after depressurization, the coating agent could precipitate out to surround and isolate the exfoliated or separated graphene sheets. This coating agent (e.g., a polymer) will eventually become a part (e.g. the matrix) of a composite material. Generally, the coating agent may include a polymer, oligomer, prepolymer, or a monomer. In one embodiment, the coating agent is poly-(dimethyl siloxane) ("PDMS") having a weight average molecular weight of preferably between about 30,000 and 200,000 g/mole. Other suitable coating agents include poly-(tetrafluoroethylene-co-hexafluoropropylene), poly-(perfluoro-propylene oxide), poly-(diethyl-siloxane), poly-(dimethyl silicone), poly-(phenylmethylsilicone), perfluoroalkylpolyethers, chloro-trifluoro-ethylene, and bromotrifluoroethylene.

The coal/coke powder particles and the coating agent may be disposed in a high pressure vessel that is isolatable from the atmosphere. In this embodiment, the coal/coke particles comprise about 25 to 85 weight percent and the coating agent comprises about 15 to 75 weight percent of material placed in the vessel. Then, the pressure vessel is sealed off from the atmosphere. This is followed by introducing high-pressure carbon dioxide into the compartment with $CO_2$ being pressurized in the vessel to preferably above approximately 1,070 psig (7.4 MPa). Then, the vessel is heated to a temperature preferably above about 40° C. These conditions define a supercritical condition of carbon dioxide whereby the coating agent is solubilized in the supercritical carbon dioxide.

With the coating agent being solubilized in the supercritical fluid, the coating agent diffuses into inter-graphene spaces to possibly expand or swell these spaces. The step of diffusing the coating agent into the spaces between the graphene planes includes maintaining diffusion for between about 10 minutes to 24 hours (preferably 1-3 hours) at supercritical conditions to produce tentatively intercalated coal/coke. The procedure further comprises catastrophically depressurizing the tentatively intercalated coal/coke to precipitate the coating agent from the supercritical fluid. During catastrophic depressurization, the supercritical fluid expands and exfoliates the graphene planes while the coating agent precipitates from the supercritical fluid to cover the layers. Although a coating agent could help, but we have discovered that typically the supercritical fluid alone is sufficiently effective in exfoliating/separating graphene sheets from coal/coke powder.

Presumably, the low viscosity and high diffusivity of the supercritical fluid allows the coating agent solubilized therein to become intercalated between the graphene planes in the coal/coke material under supercritical conditions, thereby possibly increasing the interlayer spacing. Upon depressurization, the supercritical fluid residing in the interstitial spaces rapidly expand and force the layers to exfoliate or delaminate from each other, and the coating agent previously solubilized in the supercritical fluid precipitates therefrom to deposit on the delaminated layers, preventing reformation of the van der Waals forces between graphene layers. That is, the coating agent precipitates from the supercritical fluid and attaches itself to the graphene sheet surfaces.

Although this conventional route is useful in terms of producing pristine graphene sheets that are covered with a coating agent, one has to remove this coating agent unless the coating agent is desired for an intended application (e.g., for the preparation of a polymer matrix composite with the coating agent being the monomer or polymer for this matrix). For this particular purpose, it is advantageous to have a supercritical fluid containing a curing agent dissolved therein. The curing agent, typically a low molecular weight species, can penetrate into the inter-graphene spaces, along with the supercritical fluid. Upon-depressurization, the curing agent will precipitate out to cover the newly formed graphene surfaces. In addition to possibly acting to prevent the re-stacking of graphene layers, the curing agent also serves to change the graphene surface properties, promoting the subsequent wetting of the graphene surface by a thermosetting resin (e.g., epoxide). Hence, the process further comprises mixing the curing agent-covered graphene material with a thermosetting resin.

In summary, after an extensive study, we have surprisingly observed that:
(1) Supercritical fluids containing no coating agent are in general as effective as those containing a coating agent for intercalating, exfoliating, and separating coal/coke powder. There is no major difference in the supercritical fluid temperature, pressure, time, and de-pressurization conditions between the two cases (one with and the other without a coating agent);
(2) Supercritical fluids, with or without a coating agent dissolved therein, are effective in intercalating, exfoliating, and separating a wide variety of coal/coke materials, including from petroleum coke, coal-derived coke, meso-phase coke, synthetic coke, leonardite, anthracite, lignite coal, bituminous coal, and natural coal mineral powder.
(3) With proper conditions selected for supercritical fluid intercalation and exfoliation, one could readily obtain ultra-thin graphene sheets with a thickness less than 1 nm. With other less favorable conditions (e.g., a lower depressurization rate or gas discharge rate), somewhat thicker NGPs were obtained. However, these thicker NGPs could be subjected to another cycle of supercritical fluid intercalation and exfoliation, preferably in the same pressure chamber, to yield much thinner NGPs. By repeating the cycle one or two times we could readily obtain substantially single-layer graphene.
(4) Supercritical fluids containing a surfactant dissolved therein are more effective than their counterparts containing a coating agent (e.g., polymer, monomer, and oil) or those containing no surfactant and no coating agent.
(5) The presently invented process is fast and environmentally benign.
(6) A functional group can be conveniently imparted to the resulting NGPs if a reactive chemical group is introduced into the pressure vessel to contact the NGPs therein before, during, or after NGPs are formed.

Figure 2:
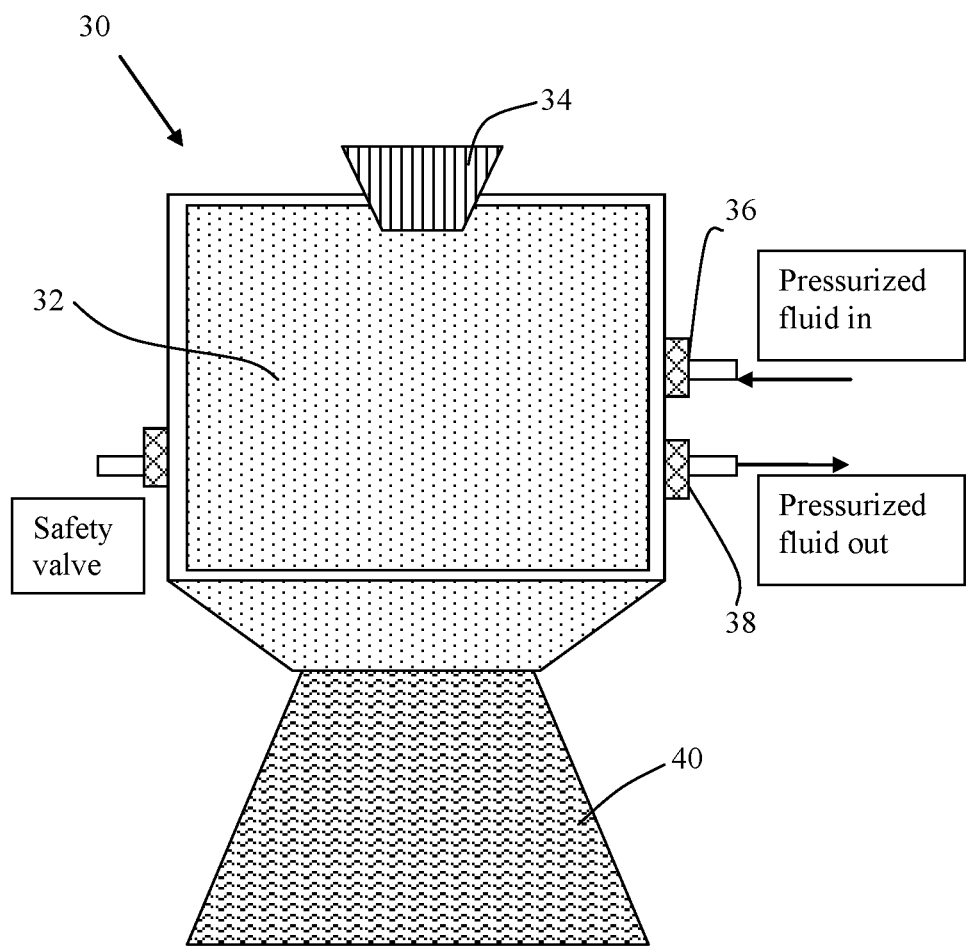
FIG. 2 Schematic drawing of an apparatus that submits coal/coke slurry to a supercritical fluid to produce isolated graphene sheets.

The best modes practice of instant invention are discussed in more details as follows: A preferred embodiment of the invention is schematically illustrated in FIG. 1 and FIG. 2. The process comprises two steps. Step (a) entails supplying particles of coke or coal powder and an optional surfactant, dispersing agent, or coating agent into a pressure chamber (30 in FIG. 2) and introducing a pressurized fluid into the chamber. The fluid is then heated and pressurized to reach a supercritical fluid state (e.g. a temperature of >31.1° C. and pressure of >72.8 atm for $CO_2$), wherein the optional surfactant, dispersing agent, or coating agent is dissolved in the supercritical fluid (32 in FIG. 2). The coke or coal powder may be selected from petroleum coke, coal-derived coke, meso-phase coke, synthetic coke, leonardite, anthracite, lignite coal, bituminous coal, or natural coal mineral powder, or a combination thereof.

Step (b) entails rapidly de-pressurizing the pressure vessel to produce the isolated graphene sheets. Under certain supercritical fluid conditions (e.g. at the lower end of the pressure scale), the produced graphene sheets can contain some multi-layer graphene platelets or sheets, each typically containing from 5 to 20 graphene planes. These graphene sheets may stay in the same pressure chamber or be discharged into a different pressure chamber having a pressurized fluid, which is then re-pressurized and heated to reach a supercritical fluid condition. After a desired period of supercritical fluid exposure time, the chamber is rapidly de-pressurized to produce thinner graphene sheets. The same or similar pressurization and de-pressurization procedures may be repeated until a desired average graphene thickness (e.g. all graphene sheets being single-layer graphene) is reached. A cascade of supercritical fluid chambers may be connected in series.

As shown in FIG. 2, the pressure chamber (vessel 30) may be equipped with a fluid inlet 36 for introducing pressurized fluid into the vessel and a fluid outlet 38 for rapidly releasing the de-pressurized fluid, which can be re-cycled and re-used. A safety valve is also provided to regulate the fluid pressure of the vessel. The coal or coke powder may be charged, on demand, into the pressure chamber 30 through a controlled conduit 34 and the processed graphene sheets may be discharged through a discharge chamber 40 and get collected by a bag or drop into a collecting liquid.

Alternatively, thick graphene sheets/platelets, after first or second pressurization/de-pressurization treatment, may be subjected to mechanical separation treatments (e.g. airjet milling, rotating-blade shearing, wet milling, etc.) to obtain thinner graphene sheets.

Further alternatively, the pressure vessel may be equipped with an ultrasonicator device, subjecting the supercritical fluid and the coal/coke powder dispersed therein to ultrasonication. Exposure of coal/coke powder to concurrent supercritical fluid and ultrasonication treatments can produce essentially all few-layer or all single-layer graphene sheets.

Using needle coke as an example, the first step may involve preparing a coke powder sample containing fine needle coke particulates (needle-shaped). The length and/or diameter of these particles are preferably less than 0.2 mm (<200 μm), further preferably less than 0.01 mm (10 μm). They can be smaller than 1 μm. The needle coke particles typically contain nanometer-scaled graphite crystallites with each crystallite being composed of multiple graphene planes.

In one example, the coke powder is then dispersed in a liquid medium (e.g., water, alcohol, or acetone) to obtain a suspension inside a pressure vessel, which is then pressurized and heated for the liquid medium to reach a supercritical fluid state (e.g. 513° K and 8.1 MPa for methanol). A dispersing agent or surfactant may be used to help uniformly disperse particles in the liquid medium. Most importantly, we have surprisingly found that the dispersing agent or surfactant facilitates the exfoliation and separation of graphene sheets from coal/coke particles. Under comparable processing conditions, a coke/coal sample containing a surfactant usually results in much thinner graphene sheets compared to a sample containing no surfactant. It also takes a shorter length of pressurization time for a surfactant-containing suspension to achieve a desired platelet dimension.

Surfactants or dispersing agents that can be used include anionic surfactants, non-ionic surfactants, cationic surfactants, amphoteric surfactants, silicone surfactants, fluoro-surfactants, and polymeric surfactants. Particularly useful surfactants for practicing the present invention include DuPont's Zonyl series that entails anionic, cationic, non-ionic, and fluoro-based species. Other useful dispersing agents include sodium hexametaphosphate, sodium lignosulphonate (e.g., marketed under the trade names Vanisperse CB and Marasperse CBOS-4 from Borregaard LignoTech), sodium sulfate, sodium phosphate, and sodium sulfonate.

Advantageously, the surfactant or dispersing agent may be selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof.

It may be noted that the conventional process for the formation of graphite intercalation compound (GICs) involves the use of highly oxidizing agents (e.g. nitric acid or potassium permanganate), which causes severe oxidation to graphite. Upon oxidation, graphite would suffer from a dramatic loss in electrical and thermal conductivity and this normally cannot be fully recovered.

In contrast, the presently invented process makes use of only very mild fluid mediums (water, alcohol, etc.). Hence, this process obviates the need or possibility to expose the coke/coal material to an oxidizing environment. If so desired, the product after supercritical fluid treatment may be subjected to a subsequent mechanical shearing treatment, such as ball milling, air milling, or rotating-blade shearing, at a relatively low temperature (e.g., room temperature). With this treatment, either individual graphene planes or stacks of graphene planes bonded together (multi-layer NGPs) are further reduced in thickness (decreasing number of layers), width, and length. In addition to the thickness dimension being nano-scaled, both the length and width of these NGPs could be reduced to smaller than 100 nm in size if so desired.

The exfoliation step in the instant invention does not involve the evolution of undesirable species, such as $NO_x$ and $SO_x$, which are common by-products of exfoliating conventional sulfuric or nitric acid-intercalated graphite compounds. These chemical species are highly regulated worldwide.

Supercritical fluid state also enables the resulting graphene sheets to be well dispersed in the very liquid medium wherein the coke/coal powder is dispersed, producing a homogeneous suspension. One major advantage of this approach is that exfoliation, separation, and dispersion of graphene sheets are achieved in a single step. A monomer, oligomer, or polymer may be added to this suspension to form a suspension that is a precursor to a nanocomposite structure. The process may include a further step of converting the suspension to a mat or paper (e.g., using any well-known paper-making process), or converting the nanocomposite precursor suspension to a nanocomposite solid.

Thus, in certain embodiments, the liquid medium comprises water, organic solvent, alcohol, a monomer, an oligomer, or a combination thereof. In other embodiments, the liquid medium further comprises a monomer or an oligomer dispersed in the liquid medium and step (b) is followed by polymerization of the monomer or oligomer to form a polymer. The graphene sheets concurrently produced can be well-dispersed in the polymer. This added advantage is also unexpected.

In some embodiments of the invention, the liquid medium further comprises a polymer dissolved or dispersed in the liquid medium and the isolated graphene sheets are mixed with the polymer to form a composite composition. This is a good approach to the preparation of graphene-reinforced polymer composites.

Alternatively, the resulting graphene sheets, after drying to become a solid powder, may be mixed with a monomer to form a mixture, which can be polymerized to obtain a nanocomposite solid. The graphene sheets can be mixed with a polymer melt to form a mixture that is subsequently solidified to become a nanocomposite solid.

Again, a coating agent for adding into the supercritical fluid may be selected from melamine, ammonium sulfate, sodium dodecyl sulfate, sodium (ethylenediamine), tetraalkylammonium, ammonia, carbamide, hexamethylenetetramine, organic amine, poly(sodium-4-styrene sulfonate), or a combination thereof. Some of the wetting agents (e.g. those containing an amine group) also serve to chemically functionalize the isolated graphene sheets, thereby improving the chemical or mechanical compatibility of the graphene sheets with a matrix resin (e.g. epoxy) in a composite material.

The following examples serve to illustrate the best modes of practice for the present invention and should not be construed as limiting the scope of the invention:

Example 1: Production of Isolated Graphene Sheets from Milled Coal-Derived Needle Coke Powder Needle coke, milled to an average length <10 μm, was used as the starting material. A needle coke sample (approximately 5 grams) was placed in a 100 milliliter high-pressure vessel. The vessel was equipped with security clamps and rings that enable isolation of the vessel interior from the atmosphere. The vessel was in fluid communication with high-pressure $CO_2$ by way of piping means and controlled or regulated by valves. A heating jacket was wrapped around the vessel to achieve and maintain the critical temperature of carbon dioxide. High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing $CO_2$ to diffuse into inter-graphene spaces and/or the amorphous zones between graphene domains. Then, the vessel was immediately depressurized "catastrophically' at a rate of about 3 milliliters per second. This was accomplished by opening a connected blow-off valve of the vessel. As a result, exfoliated graphene layers were formed, which were found to have an average thickness less than 1.0 nm. Various samples were collected with their morphology studied by SEM, TEM, and AFM observations and their specific surface areas measured by the well-known BET method. The specific surface area of the produced graphene sheets are typically in the range of 735-920 $m^2/g$, indicating that a majority of the graphene sheets being single-layer graphene, consistent with the microscopy results.

A small amount of graphene sheets was mixed with water and ultrasonicated for 15 minutes to obtain a suspension, which was then cast onto a glass surface to produce a thin film of approximately 90 nm in thickness. Based on a four-point probe approach, the electrical conductivity of the graphene film was found to be 3,965 S/cm.

Comparative Example 1a: Concentrated Sulfuric-Nitric Acid-Intercalated Needle Coke Particles One gram of milled needle coke powder as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 1,000° C. for 45 seconds. The resulting NGPs were examined using SEM and TEM and their length (largest lateral dimension) and thickness were measured. It was observed that, in comparison with the conventional strong acid process for producing graphene, the presently invented supercritical fluid process leads to graphene sheets of comparable thickness distribution, but much larger lateral dimensions (3-5 μm vs. 200-300 nm).

Graphene sheets were made into graphene paper layer using a well-known vacuum-assisted filtration procedure. The graphene paper prepared from hydrazine-reduced graphene oxide (made from sulfuric-nitric acid-intercalated coke) exhibits electrical conductivity values of 11-143 S/cm. By contrast, the graphene paper prepared from the relatively oxidation-free graphene sheets made by the presently invented supercritical fluid process exhibits a conductivity value of 1,650 S/cm.

Comparative Example 1b: Preparation of Pristine NGPs from Natural Graphite Using $CO_2$ Supercritical Fluids A natural graphite sample (approximately 5 grams) was placed in a 100 milliliter high-pressure vessel. The vessel was equipped with security clamps and rings that enable isolation of the vessel interior from the atmosphere. The vessel was in fluid communication with high-pressure $CO_2$ by way of piping means and controlled or regulated by valves. A heating jacket was wrapped around the vessel to achieve and maintain the critical temperature of carbon dioxide. High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing $CO_2$ to diffuse into inter-graphene spaces. Then, the vessel was immediately depressurized "catastrophically' at a rate of about 3 milliliters per second. This was accomplished by opening a connected blow-off valve of the vessel. As a result, exfoliated graphene layers were formed, which were found to contain pristine NGPs with an average thickness of approximately 10 nm.

A small amount of NGPs was mixed with water and ultrasonicated for 15 minutes to obtain a suspension, which was then cast onto a glass surface to produce a thin film of approximately 89 nm in thickness. Based on a four-point probe approach, the electrical conductivity of the NGP film was found to be 909 S/cm.

Example 2: Repeated Intercalation and Exfoliation with $CO_2$ Supercritical Fluids Portion of graphene sample produced in Example 1 was removed from the pressure vessel. The remaining graphene sample was subjected to another cycle of supercritical $CO_2$ intercalation and de-pressurization treatments (i.e., the above procedures were repeated with a pressure of 7.5 MPa and temperature 65° C.), yielding mostly single-layer graphene.

Example 3: Preparation of Pristine Graphene from Coal-Derived Needle Coke Using $CO_2$ Supercritical Fluids Containing a Surfactant Another graphene sample was prepared under essentially identical supercritical $CO_2$ conditions as in Example 1, with the exception that a small amount of surfactant (approximately 0.05 grams of Zonyl® FSO) was mixed with 5 grams of needle coke before the mixture was sealed in the pressure vessel. The resulting NGPs have a surprisingly low average thickness, 0.8 nm. After the pressurization and de-pressurization procedures were repeated for one more cycles, the resulting NGPs were mostly single-layer.

Example 4: Production of Isolated Graphene Sheets from Milled Petroleum Needle Coke Powder Needle coke, milled to an average length <10 μm, was used as the starting material. The dispersing agents selected include melamine, sodium (ethylenediamine), and hexamethylenetetramine. Approximately 5 grams of petroleum needle coke were placed in a high pressure vessel, which was supplied with $CO_2$ gas through pipe means as in Example 1. The pressure at approximately 8.5 MPa was maintained while the vessel was heated to about 70° C. to achieve a supercritical condition of carbon dioxide. This intercalation process was conducted for about 1 hour, followed by a sudden depressurization to the ambient pressure. The resulting expanded/exfoliated structure after the initial cycle was investigated using AFM, SEM, and BET measurements. The NGPs obtained were found to have an average thickness of 1.3 nm. The intercalation and exfoliation steps were repeated for another cycle and the resulting graphene sheets are all single-layer or double-layer.

Example 5: Graphene Sheets from Milled Lignite Coal Powder

In one example, samples of two grams each of lignite coal were milled down to an average diameter of 25.6 μm. The powder samples were subjected to ethanol-based supercritical fluid treatments: 514° K and 6.4 MPa, followed by rapid de-pressurization. The resulting graphene sheets exhibit a thickness ranging from single-layer graphene sheets to 3-layer graphene sheets based on SEM and TEM observations

Example 6: Production of Isolated Graphene Sheets from Anthracite Coal

Taixi coal from Shanxi, China was used as the starting material for the preparation of isolated graphene sheets. The raw coal was ground and sieved to a powder with an average particle size less than 200 μm. The coal powder was further size-reduced for 2.5 h by ball milling. The diameter of more than 90% of milled powder particles is less than 15 μm after milling. The raw coal powder was treated with hydrochloride in a beaker at 50° C. for 4 h to make modified coal (MC), and then it was washed with distilled water until no was detected in the filtrate. The modified coal was heat treated in the presence of Fe to transform coal into graphite-like carbon. The MC powder and $Fe_2(SO4)_3$ [TX-de:$Fe_2(SO4)_3$=16:12.6] was well-mixed by ball milling for 2 min, and then the mixture was subjected to catalytic graphitization at 2400° C. for 2 h under argon.

The coal-derived powder samples were subjected to methanol-based supercritical fluid treatments under the conditions of 513° K and 8.2 MPa, followed by rapid de-pressurization. The resulting graphene sheets exhibit a thickness ranging from single-layer graphene sheets to 5-layer graphene sheets based on SEM and TEM observations.

Example 6: Production of Isolated Graphene Sheets from Bituminous Coal

In an example, 300 mg of bituminous coal was placed in a pressure vessel, which was then subjected to a $CO_2$ supercritical fluid intercalation for 1 h, followed by rapid pressure release. The product was poured into a beaker containing a mixture of water and ethanol. After purification, the solution was concentrated using rotary evaporation to obtain solid humic acid sheets.

A curing agent, aliphatic amine (EPIKURE 3223), was mixed with the humic acid powder at a 1:1 weight ratio. Epoxy resin (EPON 828) was then mixed with the curing agent-coated humic acid sheets at a ratio of 12 parts of curing agent with 100 parts of epoxy resin and cured at 60° C. for 24 hours to obtain an graphene-like nanocomposite.

Example 7: Intercalation and Exfoliation of Leonardite Coal with a Supercritical Fluid Containing $SO_3$ $SO_3$ vapor was generated by adding and heating 10 g of fuming sulfuric acid into a reactor. The $SO_3$ vapor was passed through a column in which 10 g of leonardite was packed for receiving $SO_3$. After exposure of leonardite to $SO_3$ for one hour, the treated leonardite sample was placed in a pressure vessel. The vessel was supplied with $CO_2$ gas through pipe means as in Example 1. The pressure at approximately 8.5 MPa was maintained while the vessel was heated to about 70° C. to achieve a supercritical condition of carbon dioxide. Presumably $SO_3$ was dissolved in supercritical $CO_2$. This $CO_2$/$SO_3$ intercalation process was allowed to proceed for about 3 hours, followed by a sudden depressurization to the ambient pressure.

Upon completion of the procedure, the vessel containing NGPs was slightly heated at about 60° C. for about 15 minutes to remove excessive amount of $SO_3$ condensed on the surface of the NGPs, and the separated $SO_3$ was recovered and absorbed into the sulfuric acid in the reactor. $SO_3$-treated NGPs were washed with water and filtered. Surprisingly, $SO_3$-treated NGPs were found to be readily dispersible in water. It appears that $SO_3$ has slightly sulfonated NGPs, imparting desirable functional groups thereto.

It is of significance to note that $SO_3$, $O_3$ (ozone) and $O_2$ are but a few examples of reactive species that can be included in a supercritical fluid for exfoliating and, essentially concurrently, functionalizing NGPs.

Example 8: Production of Graphene Thin Films

In the aforementioned Example 1, a desired amount of slurry containing fully separated graphene sheets dispersed in water was made into a wet film on a PET substrate (poly ethylene terephthalate) using a slot-die coater. The wet film was then heated at 85° C. for 2 hours and mechanically compressed to become a flexible graphene film. The resulting flexible graphene film, having not been previously exposed to a significant oxidation environment, exhibits an electrical conductivity typically from 3,000 to 7,500 S/cm and thermal conductivity from 650 to 1,200 W/mK. By contrast, commercially available flexible graphite sheets, prepared by thermal exfoliation of GICs and re-compression of exfoliated graphite, exhibit an electrical conductivity typically lower than 1,200 S/cm and thermal conductivity lower than 500 W/mK. Also, graphene films produced by the conventional Hummer's method and the subsequent slot-die coating under comparable conditions show an electrical conductivity of 1,500-3,000 S/cm and thermal conductivity 400-600 W/mK.

In summary, the presently invented process is superior to many prior art processes in several aspects:
1) Prior art processes based on graphite intercalation/oxidation and high-temperature exfoliation did not allow for a good control over the oxygen content of the resulting GO or NGP platelets. The presently invented process is capable of producing pristine NGPs that have never been exposed to oxidation.
2) In another commonly used prior art approach, the graphite oxide dispersed in an aqueous solution was reduced with hydrazine, in the presence of a polymer, such as poly (sodium 4-styrenesulfonate). This process led to the formation of a stable aqueous dispersion of polymer-coated graphene platelets. In some applications of NGPs, however, a polymer coating may be undesirable. Furthermore, the commonly used reducing agent, hydrazine, is a toxic substance.

3) Conventional processes of preparing GO nano sheets that included chemical exfoliation typically were extremely tedious. Such a long process is not amenable to the mass production of conductive graphene sheets.
4) The presently invented process is capable of producing NGPs with no or little impurity. The process can obviate the need for washing and rinsing the platelets (which was required in the prior art solution approach to the exfoliation of GO and/or subsequent chemical reduction). The presently invented process is fast and environmentally benign.
5) The presently invented process is capable of producing ultra-thin NGPs, including those that are single graphene sheets.
6) This process allows for concurrently attaching a desirable functional group to the resulting NGPs (e.g., by simply introducing a desirable chemical species, such as $SO_3$, into the supercritical fluid). This is a powerful approach to varying the dispersibility or solubility of NGPs in a solvent.

The invention claimed is:

1. A process for producing isolated graphene sheets from a supply of coke or coal powder containing therein domains of hexagonal carbon atoms and/or hexagonal carbon atomic interlayers with an interlayer spacing, said process comprising: (a) exposing said supply of coke or coal powder to a supercritical fluid at a first temperature and a first pressure for a first period of time in a pressure vessel and then (b) rapidly depressurizing said supercritical fluid at a fluid release rate sufficient for effecting exfoliation and separation of said coke or coal powder to produce said isolated graphene sheets; wherein said coke or coal powder is selected from the group consisting of petroleum coke, coal-derived coke, meso-phase coke, synthetic coke, leonardite, anthracite, lignite coal, bituminous coal, natural coal mineral powder, and a combination thereof wherein said coke or coal powder has never been previously intercalated or oxidized prior to step (a).

2. The process of claim 1, wherein said supercritical fluid comprises a fluid selected from carbon dioxide, water, hydrogen peroxide ($H_2O_2$), methanol, ethanol, acetone, methane, ethane, propane, ethylene, propylene, nitrous oxide ($N_2O$), ozone, sulfonic group ($SO_3$), or a combination thereof.

3. The process of claim 1 wherein said depressurizing step is followed by a mechanical shearing treatment selected from air milling, air jet milling, wet milling, ball milling, rotating blade shearing, ultrasonication, or a combination thereof.

4. The process of claim 1, further comprising a procedure of essentially repeating step (a) and step (b) that includes (i) subjecting said isolated graphene sheets to a supercritical fluid at a second temperature and a second pressure for a second period of time in a pressure vessel and then (ii) rapidly depressurizing said fluid at a fluid release rate sufficient for effecting further exfoliation and separation of graphene sheets.

5. The process of claim 4, wherein said second temperature differs from said first temperature or said second pressure differs from said first pressure.

6. The process of claim 1, wherein said supercritical fluid contains a surfactant or dispersing agent dissolved therein.

7. The process of claim 1, wherein said pressure vessel further comprises a surfactant or dispersing agent selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, and combinations thereof.

8. The process of claim 1, wherein said pressure vessel further comprises a surfactant or dispersing agent selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof.

9. The process of claim 1, wherein said supercritical fluid comprises therein an organic solvent, a monomer, an oligomer, a polymer solution, or a combination thereof.

10. The process of claim 1 wherein said supercritical fluid further comprises a monomer or an oligomer dispersed in said fluid and said step (b) is followed by polymerization of said monomer or oligomer to form a polymer.

11. The process of claim 1 wherein said supercritical fluid comprises a coating agent dissolved therein.

12. The process of claim 11, wherein said coating agent comprises a monomer, a prepolymer or oligomer, a polymer, a resin, a curing agent, or a combination thereof.

13. The process of claim 1, wherein said supercritical fluid comprises a curing agent dissolved therein and the process further comprises mixing said isolated graphene sheets with a thermosetting resin to form a resin-graphene mixture.

14. The process of claim 13, further comprising a step of curing said resin-graphene mixture into a composite material.

15. The process of claim 1, wherein said supercritical fluid comprises a reactive chemical group and said step (a) imparts said reactive chemical group to said isolated graphene sheets.

16. The process of claim 1, wherein said process is conducted intermittently or continuously and said supply of coke or coal powder and supercritical liquid are provided into said pressure vessel intermittently or continuously.

17. A process for producing isolated graphene sheets from a supply of coke or coal powder containing therein domains of hexagonal carbon atoms and/or hexagonal carbon atomic interlayers with an interlayer spacing, said process comprising: (a) exposing said supply of coke or coal powder to a supercritical fluid at a first temperature and a first pressure for a first period of time in a pressure vessel and then (b) rapidly depressurizing said supercritical fluid at a fluid release rate sufficient for effecting exfoliation and separation of said coke or coal powder to produce said isolated graphene sheets; wherein said coke or coal powder is selected from the group consisting of petroleum coke, coal-derived coke, needle coke, synthetic coke, leonardite, anthracite, lignite coal, bituminous coal, natural coal mineral powder, and a combination thereof, wherein said step (a) is conducted under the influence of ultrasonic waves.

18. The process of claim 17, wherein said supercritical fluid comprises a fluid selected from carbon dioxide, water, hydrogen peroxide ($H_2O_2$), methanol, ethanol, acetone, methane, ethane, propane, ethylene, propylene, nitrous oxide ($N_2O$), ozone, sulfonic group ($SO_3$), or a combination thereof.

19. The process of claim 17, wherein said pressure vessel further comprises a surfactant or dispersing agent selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly (sodium 4-styrene sulfonate), sodium dodecylsulfate, sodium sulfate, sodium phosphate, sodium sulfonate, melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), and combinations thereof.

20. The process of claim 17, wherein said supercritical fluid further comprises an organic solvent, a monomer, a prepolymer, an oligomer, a polymer solution, a resin, a curing agent, or a combination thereof.

21. The process of claim 17, wherein said supercritical fluid comprises a reactive chemical group and said step (a) imparts said reactive chemical group to said isolated graphene sheets.

* * * * *